United States Patent [19]
Terrell et al.

[11] Patent Number: 5,514,298
[45] Date of Patent: May 7, 1996

[54] PHOTOSTIMULABLE PHOSPHOR FOR USE IN RADIOGRAPHY

[75] Inventors: David R. Terrell, Lint; Albert D. Adriaensens, Mortsel; Lodewijk M. Neyens, Kontich, all of Belgium; Melvin Tecotzky, Mendham, N.J.; Benjamas S. Davis, San Bernardino, Calif.

[73] Assignee: AGFA-Gevaert, N.V., Mortsel, Belgium

[21] Appl. No.: 454,000

[22] Filed: May 30, 1995

Related U.S. Application Data

[63] Continuation of Ser. No. 971,682, Nov. 4, 1992, abandoned, which is a continuation of Ser. No. 852,339, Mar. 17, 1992, abandoned, which is a continuation of Ser. No. 735,778, Jul. 29, 1991, abandoned, which is a continuation of Ser. No. 426,841, Oct. 26, 1989, abandoned, which is a continuation-in-part of Ser. No. 204,898, Jun. 10, 1988, abandoned.

[51] Int. Cl.$^6$ ............................. C09K 11/00; C09K 11/61
[52] U.S. Cl. ................................. 252/301.4 H; 250/483.1
[58] Field of Search ................ 252/301.4 H; 250/483.1

[56] References Cited

U.S. PATENT DOCUMENTS

| | | | |
|---|---|---|---|
| 4,336,154 | 6/1982 | Nishimura et al. | 252/301.4 H |
| 4,532,071 | 7/1985 | Nakamura et al. | 252/301.4 H |
| 4,539,138 | 9/1985 | Miyahara et al. | 252/301.4 H |
| 5,077,144 | 12/1991 | Takahashi et al. | 252/301.4 H |
| 5,089,170 | 2/1992 | Umemoto et al. | 252/301.4 H |

FOREIGN PATENT DOCUMENTS

| | | | |
|---|---|---|---|
| 21342 | 1/1981 | European Pat. Off. . | |
| 2928245 | 1/1980 | Germany | 252/301.4 H |

Primary Examiner—Melissa Bonner
Attorney, Agent, or Firm—Breiner & Breiner

[57] ABSTRACT

A photostimulable rare earth metal doped barium strontium fluoride phosphor, characterized in that said phosphor is within the scope of following empirical formula (I):

$$Ba_{1-x}Sr_xF_{2-a-b}Br_aX_b:zA$$

wherein:

X is at least one member selected from the group consisting of Cl and I;

x is in the range $0.06 \leq x \leq 0.50$;

a is in the range $0.75 \leq a \leq 0.96$;

b is in the range $0 \leq b < 0.15$;

z is in the range $10^{-7} < z \leq 0.15$, and

A is $Eu^{2+}$ and wherein fluorine is present stoichiometrically in said phosphor in a larger atom % than bromine taken alone or bromine combined with chlorine and/or iodine.

6 Claims, 4 Drawing Sheets

PHOTOSTIMULABLE PHOSPHOR FOR USE IN RADIOGRAPHY

This is a continuation of application Ser. No. 07/971,682 filed on Nov. 4, 1992, now abandoned; which, in turn, is a continuation of application Ser. No. 07/852,339 filed on Mar. 17, 1992, now abandoned; a continuation of application Ser. No. 07/735,778 filed on Jul. 29, 1991, now abandoned; a continuation of application Ser. No. 07/426,841 filed on Oct. 26, 1989, now abandoned; which is a continuation-in-part of application Ser. No. 07/204,898 filed Jun. 10, 1988, now abandoned.

This application is a continuation-in-part application of U.S. patent application Ser. No. 07/204,398 filed Jun. 10, 1988.

This invention relates to a photostimulable phosphor and to a method of recording and reproducing an X-ray pattern by means of a binder layer containing said phosphor in a screen or panel.

According to a classical method of recording and reproducing an X-ray pattern phosphors are used to form radiographs in conjunction with photographic silver halide emulsion materials which are highly sensitive to the emitted fluorescent light.

The phosphors used in said screens should be luminescent but not exhibit appreciable long lived emission after the X-ray source is switched off. If a screen with marked long-lived emission were to be used, it would retain its image after the X-ray beam had ceased and fresh film contacted with it would gain a so-called ghost impression that would interfere with the next image to be made. This phenomenon being undesirable in the production of radiographs by contact exposure with a fluoresent X-ray conversion screen is known under the terms "after-glow" and "lag".

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of the energy until stimulated by the scanning beam.

In U.S. Pat. No. 4,239,968 photostimulable europium-doped barium fluorohalides are described having the following empirical formula:

$$(Ba_{1-x}M_x^{II})FX:yA$$

wherein:

$M^{II}$ is one or more of Mg, Ca, St, Zn and Cd;

X is one or more of Br, Cl or I;

A is at least one member of the group consisting of Eu, Tb, Ce, Tm, Dy, Pt, Ho, Nd, Yb and Er; and x is in the range $0 \leq x \leq 0.6$ and y is in the range $0 \leq y \leq 0.2$.

These phosphors are particularly useful for application as stimulable phosphors having high sensitivity to stimulating light of a He-Ne laser beam (633 nm), the optimum of stimulation being in the range of 500 to 700 nm. The light emitted on stimulation, called stimulated light, is situated in the wavelength range of 350 to 450 nm with its main peak at 390 nm (ref. the periodical Radiology, September 1983, p. 834).

As described in said periodical the imaging plate containing the stimulable phosphor can be used repeatedly to store X-ray images simply by flooding it with light to erase the residual energy contained.

In published JA-A 60-217,287 divalent europium doped photostimulable phosphors are described which are within the scope of the following general formula:

$$BaF_{2-a}Br_a \cdot x\ NaX{:}y\ Eu^{2+}$$

wherein:

X is one or more of Cl, Br of I;

x, y and a satisfy the expressions $0 < x \leq 10^{-1}$; $0 < y < 2 \times 10^{-1}$; and $0.9 \leq a < 1$.

In published EP-A 21342 a rare earth element activated complex halide phosphor is described represented by the formula:

$$BaF_2 \cdot aBaX_2 \cdot bMgF_2 \cdot cMe'F \cdot dMe''F_2 \cdot eMe'''F_3{:}fLn$$

wherein X is at least one halogen selected from the group consisting of chlorine, bromine and iodine, Me' is at least one alkali metal selected from the group consisting of lithium and sodium, Me'' is at least one divalent metal selected from the group consisting of beryllium, calcium and strontium, Me''' is at least one trivalent metal selected from the group consisting of aluminium, gallium, yttrium and lanthanum, Ln is at least one rare earth element selected from the group consisting of Eu, Ce and Tb, and a, b, c, d, e, and f are numbers satisfying the conditions of $0.90 \leq a \leq 1.05$, $0 \leq b \leq 1.2$, $0 \leq c \leq 0.9$, $0 \leq d \leq 1.2$, $0 \leq e \leq 0.03$, $10^{-6} \leq f \leq 0.03$ and $c+d+e \neq 0$.

Preferred combinations have b=0, c=0; e=0 and a, d and f in the ranges $0.95 \leq a \leq 1.02$, $0.01 \leq d \leq 0.2$ and $10^{-4} \leq f \leq 0.01$; and b=0, c=0, and a, d, e and f in the ranges $0.95 \leq a \leq 1.02$, $0.01 \leq d \leq 0.2$, $0.0005 \leq e \leq 0.01$ and $10^{-4} \leq f \leq 0.01$ (see claims 6 and 14).

It is an object of the present invention to provide new photostimulable phosphors having a very good conversion efficiency of stored X-ray energy into light on photostimulation.

It is a further object of the present invention to provide an X-ray screen or panel containing said photostimulable phosphor dispersed in a binder layer.

It is another object of the present invention to provide a process for recording and reproducing X-ray patterns wherein said phosphors are used for storing energy contained in said X-rays and said energy at high yield is freed again by photostimulation in the form of electronically detectable photons of shorter wavelength than the light used in the photostimulation.

Other objects and advantages of the present invention will become clear from the following description.

In accordance with the present invention a photostimulable rare earth metal doped barium strontium fluoride phosphor is provided, characterized in that said phosphor is within the scope of following empirical formula (I):

$$Ba_{1-x}Sr_xF_{2-a-b}Br_aX_b{:}zA$$

wherein:

X is at least one member selected from the group consisting of Cl and I;

x is in the range $0.06 \leq x \leq 0.50$, preferably $0.07 \leq x \leq 0.60$;

a is in the range $0.75 \leq a \leq 0.96$, preferably $0.85 \leq a \leq 0.95$;

b is in the range $0 \leq b < 0.15$;

z is in the range $10^{-7} < x \leq 0.15$, and

A is $Eu^{2+}$, and wherein fluorine is present stoichiometrically in said phosphor in a larger atom % than bromine taken alone or bromine combined with chlorine and/or iodine.

The presence of the indicated concentrations of Sr together with a stoichiometric excess of fluoride with respect to the other halides in said phosphor of the above empirical formula (I) surprisingly brings about a substantial increase in the X-ray conversion efficiency as is illustrated in the graphs of accompanying FIG. 4.

In preferred photostimulable phosphors according to the present invention z is in the range $10^{-6} \leq z \leq 10^{-2}$; A is $Eu^{2+}$ alone, and a is in the range $0.872 \leq a \leq 0.93$ for x in the range $0.15 \leq x < 0.16$, in the range $0.86 \leq a \leq 0.93$ for x in the range $0.16 \leq x < 0.19$, and in the range $0.855 \leq a \leq 0.93$ for $0.19 \leq x \leq 0.3$.

A photostimulable phosphor according to the present invention can be prepared by using as starting materials:

(1) barium fluoride;

(2) barium halide (except barium fluoride);

(3) a strontium halide;

(4) at least one A containing compound selected from the group consisting of europium halide, europium oxide, europium nitrate and europium sulphate, preferably fluoride.

The preparation of said phosphor may proceed e.g. as follows:

by fusing an intimate mixture of barium fluoride or other halide with $EuF_3$, with $NH_4X$ and $NH_4Br$ by about 2 h firing at temperatures between 700° and 1000° C. in a reducing atmosphere for transforming $Eu^{3+}$ into $Eu^{2+}$, characterized in that the total gram atoms of X and Br are such that stoichiometrically speaking the concentration of F in the final product exceeds that of Br and other halides. An inert flux can be added to promote the formation of the bromide-deficient barium strontium fluorobromide.

The reducing atmosphere is a mixture of hydrogen with inert gas, e.g. argon or nitrogen or is formed in situ by reaction of charcoal and water vapour to form a mixture of hydrogen and carbon monoxide or hydrogen and carbon dioxide.

The reducing atmosphere reduces most or all of the present trivalent europium to divalent europium.

After the firing is completed the product obtained is pulverized. The pulverized product may be further fired. Multiple firing may be advantageous to improve the homogeneity and stimulation properties of the phosphor.

In accordance with the present invention a method for recording and reproducing an X-ray image is provided which method comprises the steps of:

(1) image-wise exposing a photostimulable phosphor to X-rays, (2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and (3) detecting the light emitted by the photostimulation applied in step (2), characterized in that the phosphor subjected to the treatments of said steps (1) and (2) is within the scope of the following empirical formula (I):

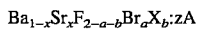

$Ba_{1-x}Sr_xF_{2-a-b}Br_aX_b:zA$ wherein:

X is at least one member selected from the group consisting of Cl and I;

x is in the range of $0.06 \leq x \leq 0.50$;

a is in the range of $0.75 \leq a \leq 0.96$;

b is in the range of $0 \leq b < 0.15$;

z is in the range of $10^{-7} < z \leq 0.15$, and

A is $Eu^{2+}$, and wherein fluorine is present stoichiometrically in said phosphor in a larger atom % than bromine taken alone or bromine combined with chlorine and/or iodine.

In the method according to the present invention the photostimulable phosphor is used preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m².

According to a preferred embodiment the phosphor layer is used as a support layer on a support sheet. Suitable support materials are made of a film forming organic resin, e.g. polyethylene terephthalate, but paper support and cardboard supports optionally coated with a resin layer such as an alpha-olefinic resin layer are also particularly useful. Glass and metal supports can also be used. The thickness of the phosphor layer is preferably in the range of 0.05 to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid reflection of light at the phosphor-containing layer—support interface and thereby increase the resolution of the photostimulable phosphor screen.

According to an embodiment the photostimulation of the phosphor-binder layer that has been image-wise or pattern-wise exposed with X-rays proceeds with a scanning light beam, preferably a laser light beam, e.g. a beam of a He-Ne or argon ion laser.

The light emitted by photostimulation is detected preferably with a transducer transforming light energy into electrical energy, e.g. a phototube (photomultiplier) providing sequential electrical signals can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, September 1983, p. 833–838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On the phosphors of the present invention measurements have been carried out to determine their photo-physical properties.

First the emission spectrum which is identical to the "prompt" emission spectrum of the phosphor under X-ray excitation is measured. The measuremnt proceeds with a spectrofluorimeter in which excitation by X-ray irradiation is carried out with an X-ray source operating at 100 kVp. During continuous X-ray excitation the emitted light is scanned by a monochromator coupled to a photomultiplier. This emission spectrum is identical to that obtained upon photostimulation and is used to determine which filters are to be used in all the other measurements. A first filler transmits the emitted light obtained by photostimulation but filters out almost all of the stimulating light. For He-Ne laser stimulation, for example, a 2.5 mm Schott BG 3 filter is used, whose transmission spectrum is described in Farb and Filterglas catalogue No. 3531/4d published by SCHOTT GLASWERKE, Mainz, West Germany. For the argon ion laser stimulation, for example, a 2.5 mm Schott BG 3 filter is used.

In the second meausrement the total photostimulable energy stored upon exposure to a given X-ray dose is determined. Prior to X-ray excitation any residual energy still present in the phosphor screen is removed by irradiation. To avoid photoexcitation during erasure a cut-off Schott GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the NONODOR X-ray source of Siemens AG—W.Germany may be used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The laser used in such measurements may, for example, be a He-Ne (633 nm) or an argon ion (514 nm) laser.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multiprogrammer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 1.77 mm2 is exposed. Only half of the laser power (5 mW) reaches the screen surface. In this way the intensity of the stimulating beam is more uniform. A red filter (3 mm SCHOTT OG 590) placed immediately in front of the laser eliminates the weak ultra-violet components in the laser emission. The signal amplitude from the photomultiplier is linear with the intensity of the photostimulating light and with the released photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $f(t)=A.e^{-t/\tau}$: wherein A is the amplitude, $\tau$ is the time constant, t is stimulation time, and e is the base number of a natural logarithm.

Half of the stored energy has been released at $t=\tau \ln 2$. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated.

Because the emission light is scattered in all directions only a fraction of the emitted light is detected by the photomultiplier. The positions of the panel and photomultiplier are such that 10% of the total emission is detected by the photomultiplier.

After all these corrections have been made a value for conversion efficiency (C.E.) is obtained expressed in pJ/mm2/mR. This value varies with screen thickness and therefore for measurements to be comparable they have to be carried out at constant phosphor coverage.

The photostimulation energy (S.E.) is defined as the energy necessary to stimulate half the stored energy and is expressed in μJ/mm2.

In a third measurement the response time is determined. This is measured by stimulating the phosphor screen with short light pulses. The laser light is modulated with an acousto-optical modulator. The rise time of the stimulating light is 15 ns. The emited light is measured with a photomultiplier (Hamamatsu R 1398) with a small anode resistor (150 ohm) to obtain a wide bandwidth (10 MHz). The rise-time of the measurement system itself is 35 ns. The response time is the time to reach half of the maximum intensity of the emitted light and is designated $t_{1/2}$.

In a fourth measurement the stimulation spectrum is determined. The light of a tungsten (quartz-iodine) lamp is fed into a monochromator (Bausch and Lomb—W.Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 700 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The present invention is illustrated by the following examples wherein reference is made to curves represented in FIGS. 1 to 4. The examples are not limiting in any way. In the examples the percentages and ratios are by weight unless otherwise mentioned. The atomic weight percentages (at %) relate to gram atoms of "A" relative to the total gram atoms of Ba,Sr and "A" as defined in the empirical formula of the photostimulable phosphors according to the present invention.

COMPARATIVE EXAMPLE 1

As in the comparative example in DE-OS 2 928 245 BaFBr: 0.001 Eu was prepared from equimolar quantities of BaF$_2$ and NH$_4$Br as follows: 26.79350 g of BaF$_2$, 0.03150 g of EuF$_3$ and 15 ml of ethanol were mixed for 15 minutes with an agate planetary ball mill. The ethanol was evaporated and 14.9830 g of NH$_4$Br, the stoichiometric amount was added after which the resulting mixture was mixed for 10 minutes. 20 g of this mixture was placed in an aluminium oxide crucible, which was placed in a larger crucible containing 77 g of charcoal and 33 ml of water. This double crucible arrangement was fired for 2 h in a box furnace at 850° C., the crucibles being placed in and withdrawn from the furnace at 850° C. BaFBr doped with 0.1 at % Eu$^{2+}$ was formed as confirmed by X-ray diffraction (XRD) analysis.

Figure 1:
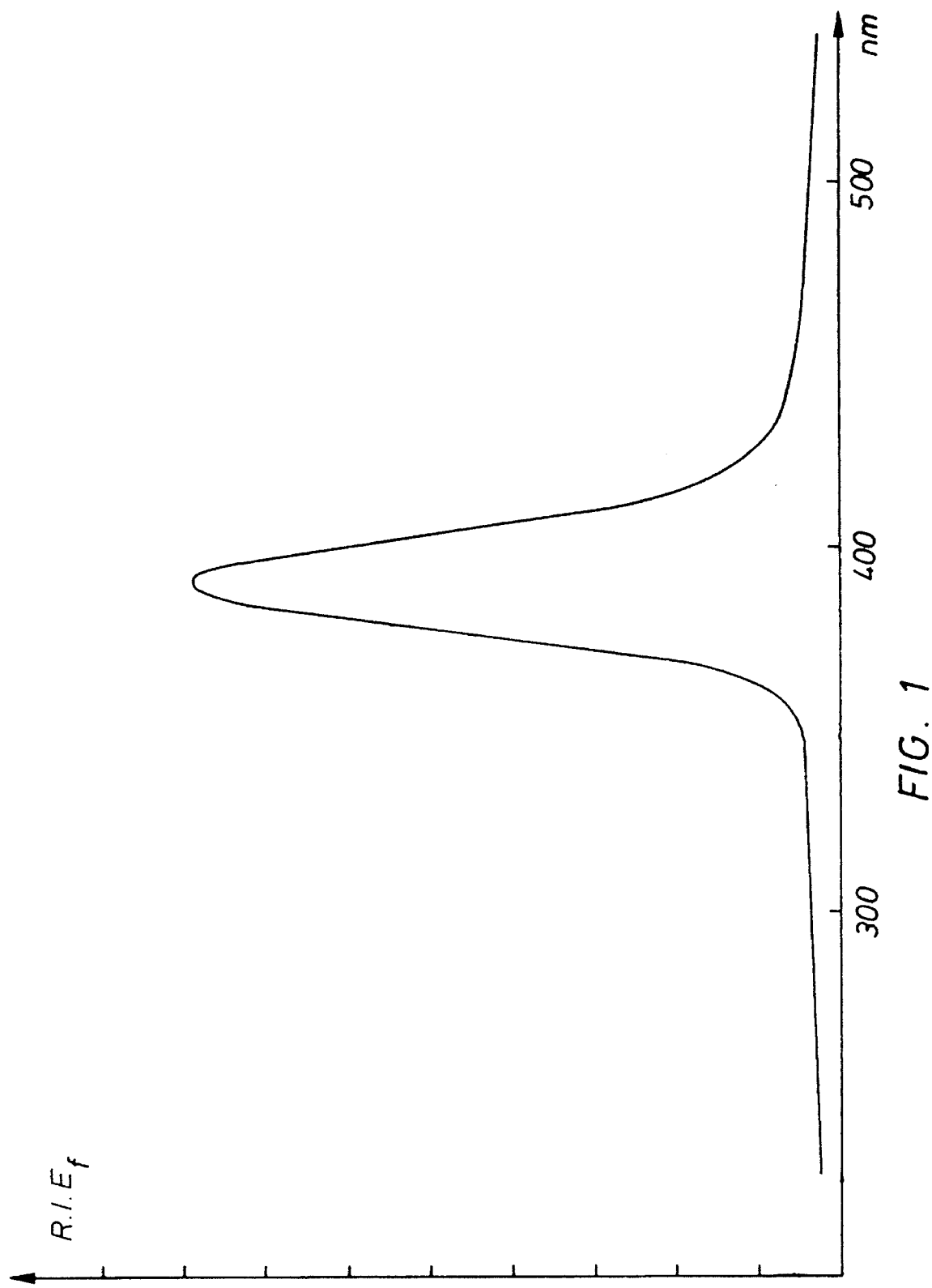
FIG. 1 represents the "prompt" emission spectrum of the phosphor described in Comparative Example 1 and in Example 29 respectively. In the diagram the relative intensity of the fluorescence emission (R.I.E$_f$) is in the ordinate and the wavelength range in nm is in the abscissa.

This sample was then subjected to X-ray excitation and the "prompt" emission spectrum was determined. This is characterized by a single emission peak at 390° C. with a half width of about 28 nm as shown in FIG. 1 indicating Eu$^{2+}$ emission and a relative peak intensity of 70.

The ground powder was then dispersed in a binder solution containing cellulose acetobutyrate dissolved in methyl ethyl ketone. The dispersion obtained was coated onto a 100 μm thick transparent sheet of polyethylene terephthalate to give a coating weight of about 1000 g/m2. This screen was then used to determine the energy storage characteristics of the phosphor. After erasing any residual stored energy by irradiating with white light filtered to remove the UV-components, the screen was irradiated with a given dose of X-rays and then stimulated with He-Ne laser light (633 nm) as described hereinbefore. The light obtained by photostimulation was filtered to remove the residual stimulating light without attenuating the emitted light and detected with a photomultiplier.

A conversion efficiency of 3.0 p3/mm2/mR and a stimulation energy of 15 μJ/mm2 were measured.

The response time of this phosphor screen was then determined by stimulating the irradiated screen with short laser light pulses from an argon ion laser as described hereinbefore. The response time being the time to reach half of the maximum intensity of emitted light and designated $t_{1/2}$ was 0.6 μs.

Figure 2:
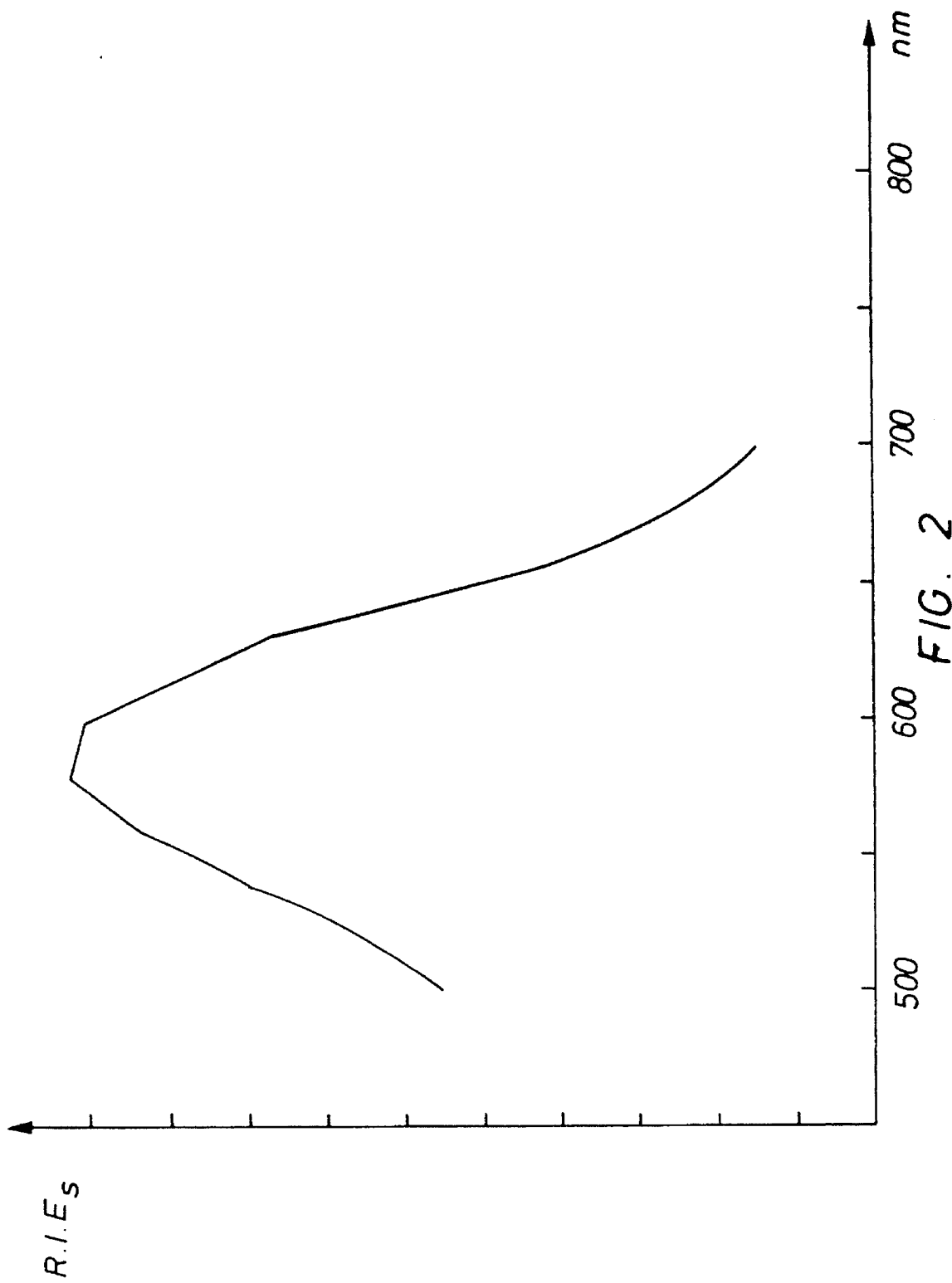
FIGS. 2 to 3 represent stimulation spectra of the phosphors described in the correlated Examples. In the diagrams the relative intensity of the stimulated emission (R.I.E$_s$) is in the ordinate and the wavelength range in nm of the stimulating light is in the abscissa.

Finally the stimulation spectrum of this phosphor was determined as described hereinbefore. This is shown in FIG. 2 and exhibits a peak at about 550 nm.

COMPARATIVE EXAMPLES 2 TO 4

The phosphors of comparative examples 2 to 4 were prepared using similar techniques to that of comparative example 1, but with various substoichiometric quantities of NH$_4$Br.

The prompt emission spectra of these phosphors were similar to that of Comparative Example 1 indicating Eu$^{2+}$ emission, but with the relative peak emission intensities (PR.E.I.) shown in Table 1 together with the % of the stoichiometric amount of NH$_4$Br in the firing mixture and the analytically determined at % values of bromine in the resulting phosphors. The balance of the stoichiometric halogen content being fluorine. The XRD spectra of these phosphors were similar to that of the phosphor of Comparative Example 1.

Screens were cast with these phosphors as described in comparative Example 1. The conversion efficiencies (C.E.) expressed in [pJ/mm2/mR] and stimulation energies (S.E.) expressed in [μJ/mm2] for 633 nm stimulation were determined as described in comparative Example 1 and are also summarized in Table 1.

TABLE 1

| Comparative Example | % of stoichiometric amount of NH$_4$Br in firing mixture | g at .% Br | PR.E.I. | C.E. | S.E. |
| --- | --- | --- | --- | --- | --- |
| 2 | 97.8 | 0.9637 | 192.6 | 2.3 | 15 |
| 3 | 95.9 | 0.9250 | 136.3 | 1.55 | 13 |
| 4 | 94.2 | 0.8721 | 133.0 | 1.9 | 14 |

INVENTION EXAMPLE 1

22.22753 g of BaF$_2$, 3.27376 g of SrF$_2$, 0.03150 g of EuF$_3$ and 15 ml of ethanol were mixed for 15 minutes with an agate planetary ball mill. The ethanol was evaporated and 14.65260 g of NH$_4$Br (97.8% of the stoichiometric amount)

were added after which the resulting mixture was mixed for 10 minutes. 20 g of this mixture was placed in an aluminium oxide crucible which as for the above Comparative Examples was placed in a larger crucible containing 77 g of charcoal and 33 ml of water. This double crucible arrangement was fired for 2 hours in a box furnace at 850° C. as for the Comparative Examples. $Ba_{0.83}Sr_{0.17}FBr$ doped with 0.1 at % Eu was formed as confirmed by XRD analysis. Elemental analysis showed a F:Br atomic ratio of 1.1087:0.8913.

The prompt emission spectrum of this phosphor was measured as described in Comparative Example 1 and was comparable to that of comparative Example 1 indicating $Eu^{2+}$ emission. The relative intensity was 51.8 which was comparable to that of the phosphor of Comparative Example 1. The conversion efficiency and stimulation energy for stimulation with a He-Ne laser (633 nm) was determined as described in Comparative Example 1 and were 16.4 pJ/mm2/mR and 19 μJ/mm2 respectively (see Table 2).

Figure 3:
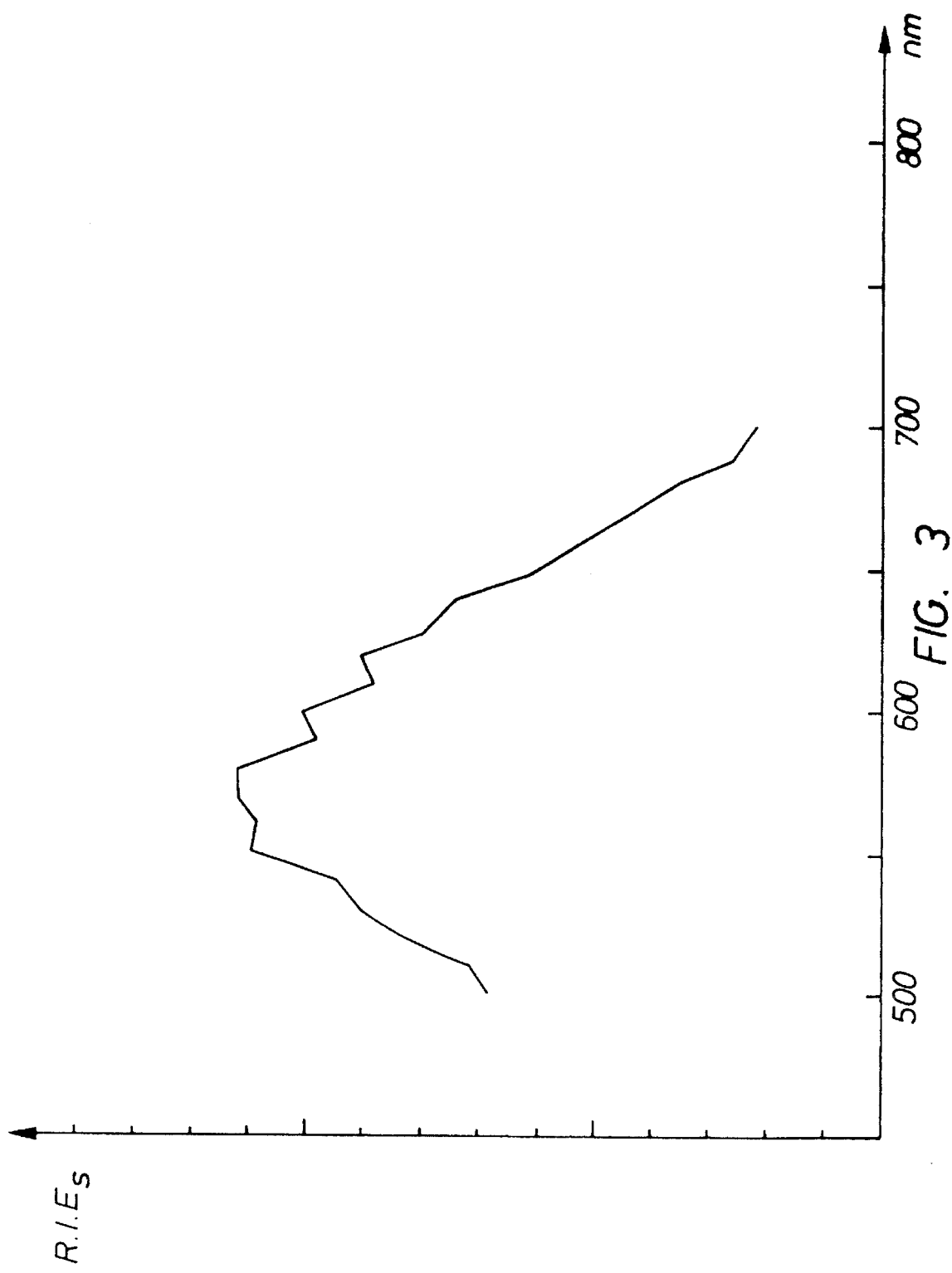
Figure 4:
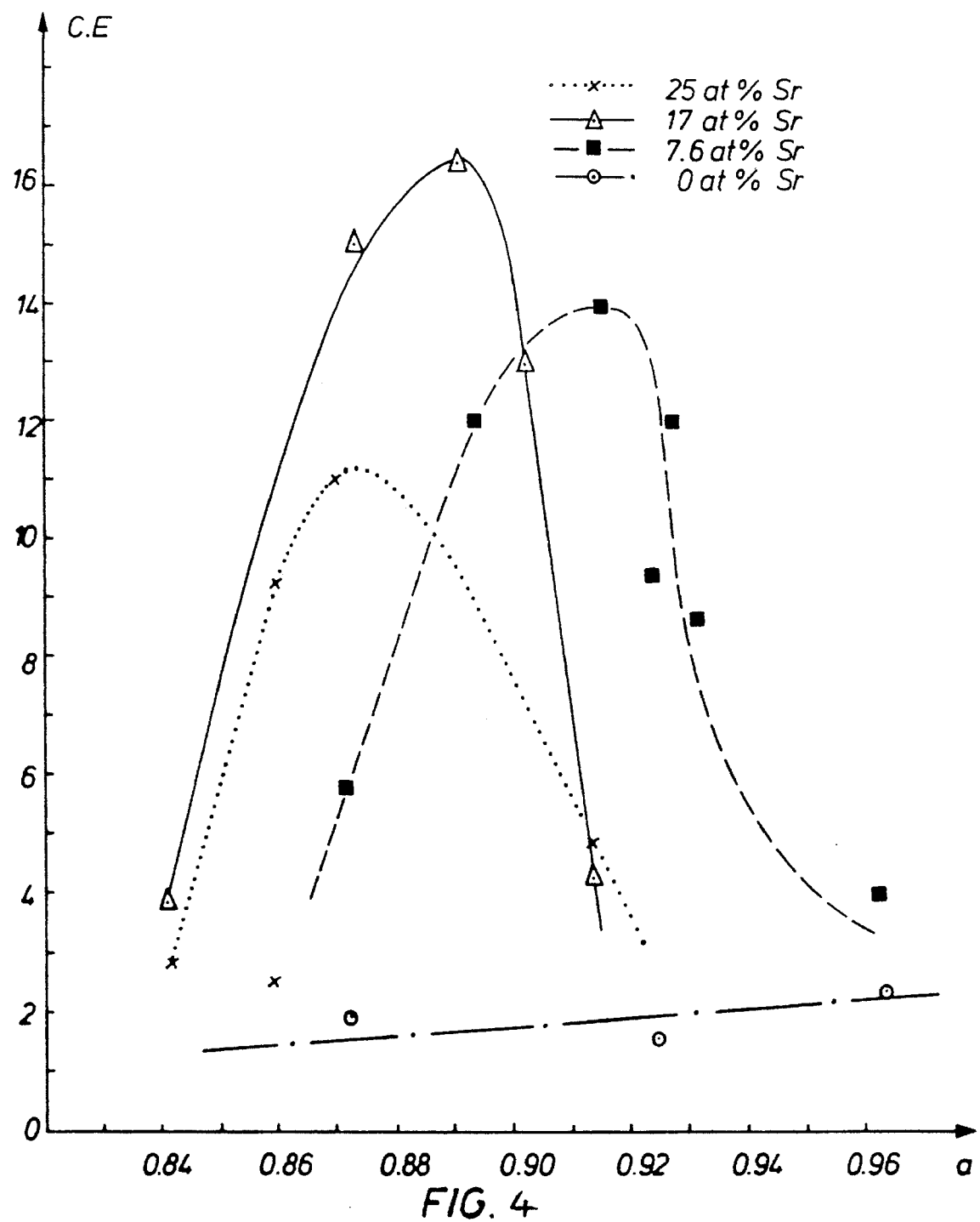
FIG. 4 represents diagrams relating to stimulable phosphors according to empirical formula (I), wherein y=0, b=0, A=Eu, z being 0.1 at % but having different Sr contents expressed in atom percent (at %) and wherein conversion efficiency (C.E. in pJ/mm2/mR) is plotted against bromide content expressed by "a" of the empirical formula (I).

The stimulation spectrum for this phosphor was determined as described in Comparative Example 1 and is shown in FIG. 3 exhibiting a peak at about 570 nm.

INVENTION EXAMPLES 2 to 6

The phosphors of Invention Examples 2 to 6 were prepared using similar techniques to that of Invention Example 1, but with various quantities of $NH_4Br$.

The prompt emission spectra of these phosphors were similar to that of Example 1 indicating $Eu^{2+}$ emission, but with the relative intensities (PR.E.I.) given in Table 2 together with the % of the stoichiometric amount of $NH_4Br$ in the firing mixture and the analytically determined "a" values in the resulting phosphors. The XRD spectra of these phosphors were similar to that of the phosphor of Example 1.

Screens were cast with these phosphors as described in Comparative Example 1. The conversion efficiencies (C.E.) expressed in [pJ/mm2/mR] and stimulation energies (S.E.) expressed in [μJ/mm2] for 633 nm stimulation were determined as described in Comparative Example 1 and are also summarized in Table 2:

TABLE 2

| Invention Example No. | % of stoichiometric amount of $NH_4Br$ in firing mixture | a | PR.E.I. | C.E. | S.E. |
|---|---|---|---|---|---|
| 1 | 97.8 | 0.8913 | 51.8 | 16.4 | 19 |
| 2 | 100 | 0.8731 | 63 | 15 | 21 |
| 3 | 97.8 | 0.9024 | 63.8 | 13 | 20 |
| 4 | 94.2 | 0.8409 | 84.7 | 3.9 | 21 |
| 5 | 100 | 0.9135 | 82.0 | 4.3 | 21 |
| 6 | 95.9 | 0.8767 | 69.2 | 14.1 | 20 |

INVENTION EXAMPLES 7 to 10

The phosphors of Invention Examples 7 to 10 were prepared using similar techniques to that of Invention Example 1, but with 25 at % strontium instead of 17 at % strontium and with various quantities of $NH_4Br$. The prompt emission spectra of these phosphors were similar to that of Invention Example 1 indicating $Eu^{2+}$ emission, but with the relative intensities (PR.E.I.) given in Table 3 together with the % of the stoichiometric amount of $NH_4Br$ in te firing mixture and the analytically determined "a" values in the resulting phosphors. The XRD spectra of these phosphors were similar to that of the phosphor of Invention Example 1.

Screens were cast with these phosphors as described in Comparative Example 1. The conversion efficiencies (C.E.) expressed in [pJ/mm2/mR] and stimulation energies (S.E.) expressed in [μJ/mm2] for 633 nm stimulation were determined as described in Comparative Example 1 and are summarized in Table 3.

TABLE 3

| Invention Example No. | % of stoichiometric amount of $NH_4Br$ in firing mixture | a | PR.E.I. | C.E. | S.E. |
|---|---|---|---|---|---|
| 7 | 110 | 0.8701 | 59.2 | 11 | 18 |
| 8 | 100 | 0.9136 | 80.0 | 4.9 | 20 |
| 9 | 97.8 | 0.8594 | 72.5 | 9.2 | 17 |
| 10 | 95.9 | 0.8417 | 98.6 | 2.8 | 21 |

INVENTION EXAMPLES 11 to 20

The phosphors of invention examples 11 to 20 were prepared using similar techniques to that of Invention Example 1, but with 7.6 at % strontium instead of 17 at % of strontium and with various quantities of $NH_4Br$.

The prompt emission spectra of these phosphors were similar to that of Invention Example 1 indicating $Eu^{2+}$ emission, but with the relative intensities (PR.E.I.) given in Tabel 4 together with the % of the stoichiometric amount of $NH_4Br$ in the firing mixture and the analytically determined "a" values of bromine and gram atom (g at.) values of fluorine in the resulting phosphors. The XRD spectra of these phosphors were similar to that of the phosphor of Invention Example 1.

Screens were cast with these phosphors as described in Comparative Example 1. The conversion efficiencies (C.E.) expressed in [pJ/mm2/mR] and stimulation energies (S.E.) expressed in [μJ/mm2] for 633 nm stimulation were determined as described in Comparative Example 1 and are summarized in Table 4.

TABLE 4

| Example No. | stoichiometric amount of $NH_4Br$ in firing mixture | a | g at. F | PR.E.I. | C.E. | S.E. |
|---|---|---|---|---|---|---|
| 11 | 97.8 | 0.928 | 1.076 | 68 | 12 | 20 |
| 12 | 97.8 | 0.962 | 1.038 | 138 | 4 | 17 |
| 13 | 95.9 | 0.932 | 1.050 | 58 | 8.7 | 26 |
| 14 | 95.9 | 0.943 | 1.057 | 125 | 12 | 19 |
| 15 | 93.9 | 0.916 | 1.090 | 57 | 14 | 38 |
| 16 | 93.9 | 0.920 | 1.092 | 142 | 9.4 | 22 |
| 17 | 93.0 | 0.894 | 1.112 | 49 | 12 | 35 |
| 18 | 93.0 | 0.924 | 1.075 | 161 | 9.4 | 22 |
| 19 | 100 | 0.932 | — | 57.1 | 4.9 | 37 |
| 20 | 110 | 0.872 | — | 72.9 | 5.8 | 18 |

INVENTION EXAMPLES 21 to 27

The phosphors of invention examples 21 to 27 were prepared using similar techniques to that of example 1, but with 7.6 at % strontium instead of 17 at % strontium, with europium concentrations of $5 \times 10^{-4}$, $1.3 \times 10^{-3}$, $3 \times 10^{-3}$, $10^{-2}$, $10^{-1}$, 1 and 3 at % and with 94.2% of the stoichiometric quantity of $NH_4Br$.

The prompt emission spectra of these phosphors were similar to that of Comparative Example 1 except for Examples 21 and 22 the phosphors of which showed a slight peak broadening and an additional peak at about 320 nm due to the intrinsic emission of the host lattice indicating mainly $Eu^{2+}$ emission. The relative intensities (PR.E.I.) are given in Table 5. The XRD spectra of these phosphors were similar to that of the phosphor of Example 1.

Screens were cast with these phosphors as described in Comparative Example 1.

The conversion efficiencies (C.E.) expressed in [pJ/mm2/mR] and stimulation energies (S.E.) expressed in [µJ/mm2] for 633 nm stimulation were determined as described in Comparative Example 1 and are summarized in Table 5.

TABLE 5

| Example No. | Europium concentration z | PR.E.I. | C.E. | S.E. |
|---|---|---|---|---|
| 21 | $5 \times 10^{-6}$ | 32.2 | 9.86 | 20 |
| 22 | $1.3 \times 10^{-5}$ | 40.5 | 9.5 | 18 |
| 23 | $3 \times 10^{-5}$ | 52.2 | 12.6 | 24 |
| 24 | $10^{-4}$ | 82.9 | 12.5 | 19 |
| 15 | $10^{-3}$ | 125 | 12 | 19 |
| 25 | $10^{-3}$ | 73.8 | 8.8 | 19 |
| 26 | $10^{-2}$ | 107.6 | 8.3 | 17 |
| 27 | $3 \times 10^{-2}$ | 111.3 | 5.5 | 218 |

We claim:

1. A photostimulable rare earth metal doped barium strontium fluoride phosphor, characterized in that said phosphor is within the scope of the following empirical formula (I):

$$Ba_{1-x}Sr_xF_{2-a-b}Br_aX_b : zEu^{2+}$$

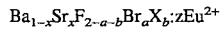

wherein:

X is at least one member selected from the group consisting of Cl and I;

x is in the range $0.06 \leq x \leq 0.50$;

a is in the range $0.75 \leq a \leq 0.96$;

b is in the range $0 \leq b < 0.15$, and z is in the range $10^{-7} \leq z \leq 0.15$ said phosphor being obtained by:

admixing the following starting materials:
(1) barium fluoride;
(2) a strontium halide,
(3) at least one Eu containing compound selected from the group consisting of europium halide, europium oxide, europium nitrate and europium sulphate, and fusing an intimate mixture of said ingredients with $NH_4Br$ as the bromide source and optionally with $NH_4X$, X being as defined above, in a reducing atmosphere for transforming $Eu^{3+}$ into $Eu^{2+}$, the total gram atoms of X and Br being such that stoichiometrically the concentration of F in the final product exceeds that of Br and other halides to obtain a product having said empirical formula (I) with Sr being present substantially in a Matlockite structure.

2. A photostimulable phosphor according to claim 1 wherein x is in the range $0.07 \leq x \leq 0.60$ and a is in the range $0.85 \leq a \leq 0.95$.

3. A photostimulable phosphor according to claim 1 wherein z is in the range $10^{-6} \leq z \leq 10^{-2}$; A is $Eu^{2+}$ alone, and a is in the range $0.872 \leq a \leq 0.93$ for x in the range $0.15 \leq x < 0.16$, in the range $0.86 \leq a \leq 0.93$ for x in the range $0.16 \leq x < 0.19$, and in the range $0.855 \leq a \leq 0.93$ for x in the range $0.19 \leq x \leq 0.3$.

4. A radiation image storage panel comprising in binder layer the photostimulable phosphor of claim 1.

5. A radiation image storage panel comprising in binder layer the photostimulable phosphor of claim 2.

6. A radiation image storage panel comprising in binder layer the photostimulable phosphor of claim 3.

* * * * *